(12) United States Patent
Schmuck

(10) Patent No.: US 6,193,842 B1
(45) Date of Patent: *Feb. 27, 2001

(54) PREPARATION OF INSULANT BOARDS BASED ON MINERAL AND PAPER FIBER

(75) Inventor: Manfred Schmuck, Essen (DE)

(73) Assignee: Th Goldschmidt Ag, Essen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/906,470

(22) Filed: Aug. 5, 1997

(30) Foreign Application Priority Data

Aug. 9, 1996 (DE) .............................................. 196 32 152

(51) Int. Cl.$^7$ .......................... D21H 13/40; C04B 24/12
(52) U.S. Cl. ......................... 162/145; 162/152; 162/155; 162/164.1; 162/166; 162/168.2; 162/179
(58) Field of Search ..................................... 162/145, 146, 162/152, 156, 158, 149, 153, 155, 164.4, 164.1, 164.6, 166, 168.2, 179

(56) References Cited

U.S. PATENT DOCUMENTS

| | | | |
|---|---|---|---|
| 2,772,603 | * 12/1956 | Waggoner | 162/145 |
| 3,039,914 | * 6/1962 | Reiman | 162/145 |
| 3,300,372 | * 1/1967 | Bauer | 162/145 |
| 3,779,861 | * 12/1973 | Jones | 162/145 |
| 4,153,503 | * 5/1979 | Booth et al. | 162/123 |
| 4,251,320 | * 2/1981 | Cederqvist et al. | 162/55 |
| 4,284,470 | * 8/1981 | Bondoc | 162/123 |
| 4,806,205 | * 2/1989 | Crutchfield et al. | 162/145 |
| 5,047,120 | * 9/1991 | Izard et al. | 162/101 |
| 5,275,654 | 1/1994 | Cowan . | |

FOREIGN PATENT DOCUMENTS 60-158300 * 8/1985 (JP) .
3-44398 * 3/1991 (JP) .

* cited by examiner

Primary Examiner—Stanley S. Silverman
Assistant Examiner—José S. Fortuna
(74) Attorney, Agent, or Firm—Frommer Lawrence & Haug LLP

(57) ABSTRACT

A is a process for preparing insulant boards based on mineral and paper fiber by slurrying mineral fiber, binder and customary additives in water, forming the insulant board by applying the slurry to a wire, and drying and consolidating the insulant board, which comprises using surface-active compounds to achieve faster and better drainage of the filter residues to be dried.

12 Claims, No Drawings

PREPARATION OF INSULANT BOARDS BASED ON MINERAL AND PAPER FIBER

The present invention relates to a process for preparing insulant boards based on mineral and paper fiber by slurrying mineral fiber, binder and customary additives in water, forming the insulant board by applying the slurry to a wire, and drying and consolidating the insulant board.

Such boards, provided with decorative surfaces, are predominantly used as sound insulation in suspended ceilings or wall panels. However, they also find utility in building fire protection, especially as door linings and linings for beams and supports in steel structures and for air and electric cabling ducts.

The boards in question are produced in a wet process. In this process, a highly aqueous slurry of mineral wool, paper fiber, starch and clay is prepared and passed to a wire to drain off some of the water under suction. The resulting wire cake is then passed into an oven, where the rest of the water evaporates at elevated temperature. At the same time, the starch gel dries hard and forms a firm bond between the crossing mineral and paper fibers.

The aqueous slurry is admixed with nonionic surfactants to achieve faster drainage of the machine wire and also in order that the resulting foam may reduce the density. However, this addition of surfactant has the disadvantage that, after drying, a highly hydrophilic component remains in the boards. These disadvantages show themselves specifically as follows:

After the dried crude boards have been sanded, they are coated with waterborne emulsion paints. Since the substrate is highly porous a lot of paint is absorbed into the substrate, and therefore works paint.

Furthermore, the prior art surfactants tend to adsorb atmospheric humidity. This may cause the binder used to soften. The binding force is reduced as a result, and the framed boards may then begin to sag under their own weight.

It is an object of the present invention to dewater the mixture to be dried as completely as possible ahead of the drying process and not leave any hydrophilic surfactant in the board.

This object is achieved according to the invention by the use of the below-recited surface-active compounds.

The preferred surface-active compounds are betaines which conform to the general formula

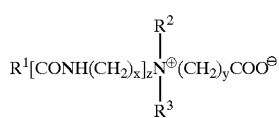

I where
R$^1$ is an alkyl radical of a fatty acid having 6 to 21 carbon atoms,
R$^2$ and R$^3$ are independently of each other alkyl radicals having 1 to 4 carbon atoms,
x is 2 or 3,
y is 1, 2 or 3, and
z is 0 or 1.
Particular preference is given to adding a betaine in which
R$^1$=the alkyl radical of a fatty acid mixture obtained from hydrogenated coconut fat,
R$^2$ and R$^3$ each=a methyl radical,
x=3,
y=2, and
z=1.

A further feature of the invention is the use of amine oxides of the general formula

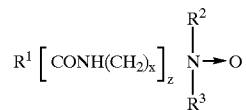

II where
R$^1$ is an alkyl radical of a fatty acid having 6 to 18 carbon atoms,
R$^2$ and R$^3$ are independently of each other alkyl radicals having 1 to 4 carbon atoms,
x is 2 or 3, and
z is 0 or 1.
It is advantageous to use amine oxide in which
R$^1$=the alkyl radical of a fatty acid mixture obtained from hydrogenated coconut fat,
R$^2$ and R$^3$ each=a methyl radical,
x=3, and
z=1.

Further surfactants added are quaternary ammonium compounds which conform to the following general formula:

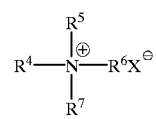

III where
R$^4$ is an alkyl or alkenyl radical having 8 to 22 carbon atoms,
R$^5$ is an alkyl or hydroxyalkyl radical having 1 to 5 carbon atoms,
R$^6$ is R$^4$ or R$^5$,
R$^7$ is R$^5$ or optionally a substituted benzyl radical, and
x is an anion.

A particularly preferred representative of this group is stearyltrimethylammonium chloride, bromide or methosulfate; examples of further compounds which can be used are stearyldimethylhydroxypropylammonium halides, cetyltrimethyl-ammonium chloride, bromide or methosulfate, lauryl-dimethylammonium chloride and bromide and lauryldimethylammonium hydroxypropyl and hydroxyethyl salts or else cocoyltrimethylamnonium halides.

Of particular effectiveness are ester quats of the formula

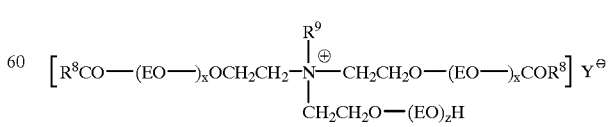

IV where
R$^8$CO is an aliphatic, optionally hydroxyl-substituted acyl radical having 12 to 22 carbon atoms and 0 or 1 double bond, $R^9$ is a methyl group or a polyethylene glycol ether chain having 1 to 5 ethylene oxide units, x and z are each 0 or together from 1 to 20, and Y is halogen, alkylsulfate or alkylphosphate.

Particular preference is given to an ester quat of the formula

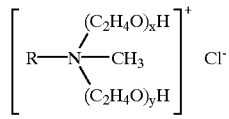

where

R is the alkyl radical of a fatty acid mixture obtained from hydrogenated coconut fat, and x+y=15.

The preparation of the abovementioned surface-active compounds is described in a wide range of patent literature, which need not be cited here in detail.

The surface-active compounds used have been found to give very rapid drainage, so that the filter residues to be dried contain distinctly less water. As a result, energy is saved and higher production speeds are achieved. The dried boards have distinctly hydrophobic properties at their surface.

It is advantageous to add hydrophobicizing silicone resins to the mineral and paper fiber slurry. The use of these known silicone resins in conjunction with the surface-active compounds used according to the invention provides even more uniform and better hydrophobicization.

The examples which follow illustrate the process of the invention.

The first step is to prepare a mixture which does not include an added surfactant. 3 l of water, 120 g of rockwool, 10 g of starch, 30 g of clay and 0.4% by weight of a 50% hydrophobicizing methylsilicone resin emulsion, based on the abovementioned solids, are thoroughly mixed.

EXAMPLE 1

(not according to invention)

The above-described standard mixture is admixed with 0.1% by weight of a prior art surfactant, specifically a nonylphenol ethoxylate having 6 ethylene oxide groups.

EXAMPLE 2

(according to invention)

The standard mixture is admixed with 0.1% by weight of a betaine of the formula

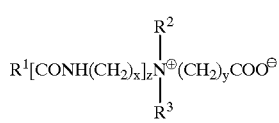

where $R^1$=the alkyl radical of fatty acid mixture obtained from hydrogenated coconut fat, $R^2$ and $R^3$ each=a methyl radical, x=3, y=2, and z=1.

EXAMPLE 3

(according to invention)

The standard mixture is admixed with 0.1% by weight of an amine oxide of the formula

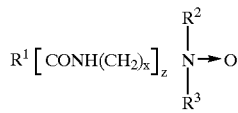

where $R^1$=the alkyl radical of fatty acid mixture obtained from hydrogenated coconut fat, $R^2$ and $R^3$ each=a methyl radical, x=3, and z=1.

EXAMPLE 4

(according to invention)

The standard mixture is admixed with 0.1% by weight of a stearyltrimethylammonium chloride.

Example 5 (according to invention)

The standard mixture is admixed with 0.1% by weight of an ester quat of the formula

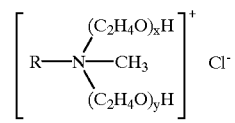

where

R is the alkyl radical of fatty acid mixture obtained from hydrogenated coconut fat, and x+y=15.

The surfactant concentrations used are based on the solids content present in the standard mixture.

This slurry is introduced into a suction filter provided with a black-ribbon filter paper and sucked down in a water-jet vacuum of 50 mbar.

| Mixture | TIME (MINUTES) |
| --- | --- |
| Standard Mixture | 2 |
| Prior Art Surfactant (Ex. 1) | 22 |
| Example 2 | 11 |
| Example 3 | 11.5 |
| Example 4 | 10 |
| Example 5 | 10.5 |

Accordingly, the residues present on the filter paper still contain the following water contents:

| Standard mixture | 61% |
| --- | --- |
| Example 1 | 56% |

-continued

| | |
|---|---|
| Example 2 | 46% |
| Example 3 | 45% |
| Example 4 | 44% |
| Example 5 | 45% |

EXAMPLE 6

This example demonstrates by means of the water absorption values the appreciably improved hydrophobic properties of a mineral fiber ceiling board treated with the surfactants used according to the invention.

The boardlike filter residues of Examples 1, 2, 3, 4 and 5 are each dried at 170° C. for 1¾ hours, weighed after cooling and then immersed for 2 hours in water at a depth of 5 cm in a water bath. Thereafter the above-recited samples are removed, daubed with filter paper to remove the standing water and weighed back. The following water absorption values are obtained:

| | |
|---|---|
| Example 1 | 18% |
| Example 2 | 7% |
| Example 3 | 9% |
| Example 4 | 7% |
| Example 5 | 8% |

The water absorption values clearly show that the use of the surfactants of the invention makes it possible to produce boards having hydrophobic properties.

As well as providing appreciably faster drainage compared with the standard mixture and with the sample containing alkylarylsulfonate (nonylphenol ethoxylates having 6 ethylene oxide groups), the filter residues prepared using the surface-active compounds of the invention contain distinctly less water. This means not only lower energy costs but also higher production rates in the manufacture of mineral and paper fiber boards.

What is claimed is:

1. A process for reducing water content and improving the hydrophobic properties of insulant boards comprised of mineral wool and paper fibers, which comprises forming a slurry of mineral wool fibers, paper fibers, binders, additives, and at least one betaine of the formula

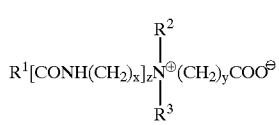
(I)

where
$R^1$ is an alkyl radical of a fatty acid having 6 to 18 carbon atoms,
$R^2$ and $R^3$ are independently of each other alkyl radicals having 1 to 4 carbon atoms,
x is 2 or 3,
y is 1, 2 or 3, and
z is 0 or 1 in amount from 0.1 to 3% by weight based on solids; applying the slurry to a wire to form the insulant board; and drying and consolidating the insulant board.

2. The process of claim 1, wherein the betaine is
$R^1$ =the alkyl radical of a fatty acid mixture obtained from hydrogenated coconut fat,
$R^2$ and $R^3$ each=a methyl radical,
x=3,
y=2, and
z=1.

3. The process of claim 1, wherein a hydrophobicizing silicone resin is added to the slurry.

4. A process for reducing water content and improving the hydrophobic properties of insulant boards comprised of mineral wool and paper fibers, which comprises forming a slurry of mineral wool fibers, paper fibers, binders, additives, and at least one amine oxide of the formula

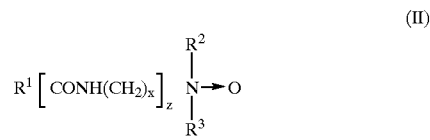
(II)

where
$R^1$ is alkyl radical of a fatty acid having 6 to 18 carbon,
$R^2$ and $R^3$ are independently of each other alkyl radicals having 1 to 4 carbon atoms
x is 2 or 3, and
z is 0 or 1, in amounts from 0.01 to 3% by weight, based on solids; applying the slurry to a wire to form the board, and drying and consolidating the insulant board.

5. The process of claim 4, wherein an amine oxide is
$R^1$ =the alkyl radical of a fatty acid mixture obtained from hydrogenated coconut fat,
$R^2$ and $R^3$ each=a methyl radical, x=3, and z=1.

6. The process of claim 4, wherein a hydrophobicizing silicone resin is added to the slurry.

7. A process for reducing water content and improving the hydrophobic properties of insulant boards comprised of mineral wool and paper fibers, which comprises forming a slurry of mineral wool fibers, paper fibers, binders, additives, and at least one quaternary ammonium compound of the formula

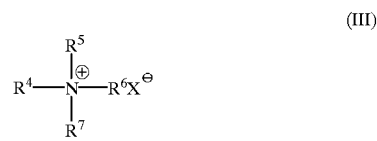
(III)

where
$R^4$ is an alkyl or alkenyl radical having 8 to 22 carbon atoms,
$R^5$ is an alkyl or hydroxyalkyl radical having 1 to 5 carbon atoms,
$R^6$ is $R^4$ or $R^5$,
$R^7$ is $R^5$ or optionally a substituted benzyl radical, and
X is an anion, in amounts from 0.01 to 3% by weight, based on solids; applying the slurry to a wire to form the board, and drying and consolidating the insulant board.

8. The process of claim 7, wherein the quaternary ammonium compound is stearyltrimethylammonium chloride.

9. The process of claim 7, wherein a hydrophobicizing silicone resin is added to the slurry.

10. A process for reducing the water content and improving the hydrophobic properties of insulant boards comprised of mineral wool and paper fibers, which comprises forming a slurry of mineral wool fibers, paper fibers, binders, additives, and at least one ester quad of the formula

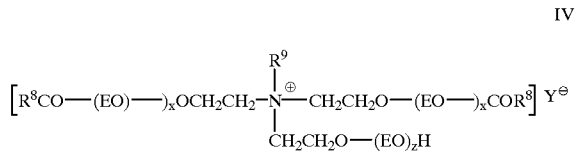

IV where
- $R^8CO$ is aliphatic, optionally hydroxyl-substituted acyl radical having 12 to 22 carbon atoms and 0 or 1 double bond,
- $R^9$ is a methyl group or a polyethylene glycol ether chain having 1 to 5 ethylene oxide units,
- x and z are each 0 or together form 1 to 20, and
- y is halogen, alkylsulfate or alkylphosphate, in amounts from 0.01 to 3% by weight, based on solids; applying the slurry to a wire to form the board, and drying and consolidating the insulant board.

11. The process of claim 10, wherein the ester quat has the formula

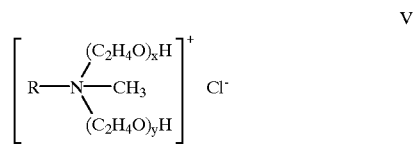

V where

R is the alkyl radical of a fatty acid mixture obtained from hydrogenated coconut fat, and x+y=15.

12. The process of claim 10, wherein a hydrophobicizing silicone resin is added to the slurry.

* * * * *